: 3,528,786
PRODUCTION OF SODIUM SILICOFLUORIDE
FROM WET PROCESS PHOSPHORIC ACID
William A. Satterwhite and Jack M. Carter, Lakeland, Fla., assignors to United States Steel Corporation, a corporation of Delaware
Continuation-in-part of application Ser. No. 546,877, May 2, 1966. This application Sept. 5, 1969, Ser. No. 855,730
Int. Cl. B01d 9/00; G01b 33/10
U.S. Cl. 23—302
9 Claims

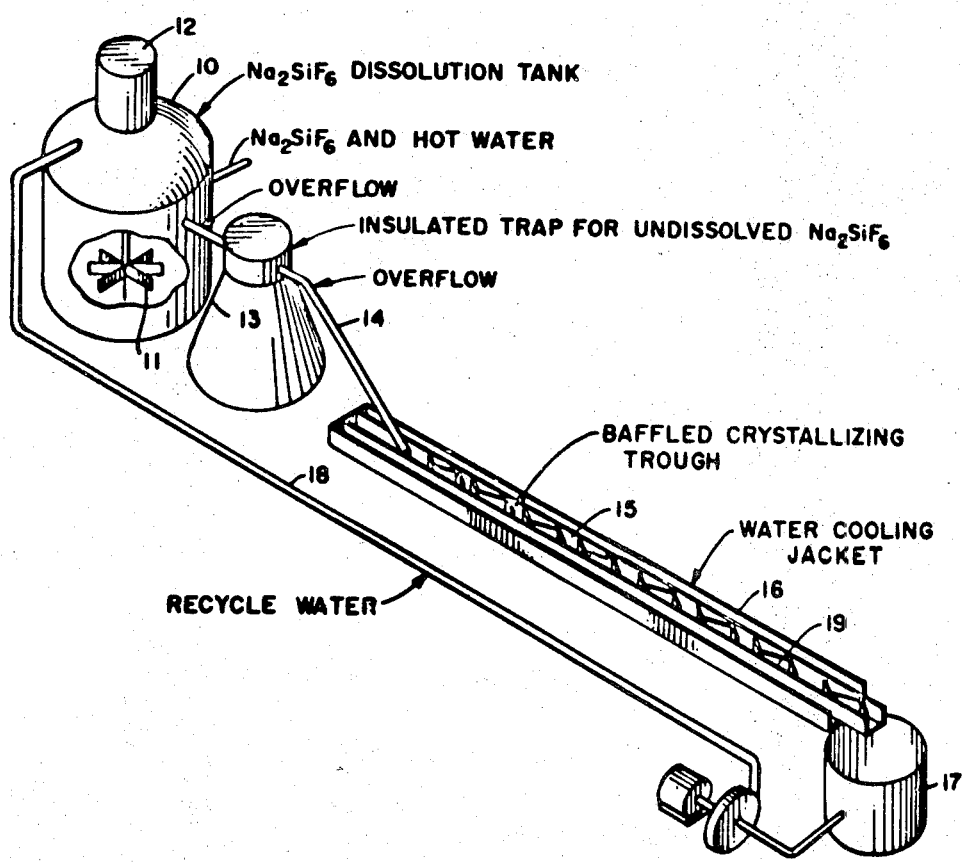

ABSTRACT OF THE DISCLOSURE

Purified crystals of sodium silicofluoride are prepared by dissolving precipitated sodium silicofluoride resulting from the introduction of sodium ions into wet process orthophosphoric acid in hot water containing less than 1% by weight of impurities at a temperature of at least 89° C. and then forming sodium silicofluoride crystals by slowly cooling the hot solution to form large crystals of purified sodium silicofluoride. The impurities remain in the water solution and can be easily separated by filtration.

---

This application is a continuation-in-part of application Ser. No. 546,877, filed May 2, 1966, now abandoned.

This invention relates to the production of sodium silicofluoride from wet process pohsphoric acid, and more particularly to the preparation of the product in crystals of large size.

Wet process phosphoric acid contains as impurities fluorine, fluosilicates, aluminum and iron salts, and other impurities. Such acid, as, for example, 30 weight percent $P_2O_5$ orthophosphoric acid or similar feed acid, may be treated to precipitate sodium silicofluoride and the precipitate may be separated by centrifuge or filtration to provide a crude sodium silicofluoride product. For example, a sodium ion, such as is provided by sodium sulfate, sodium carbonate, etc., may be introduced into the wet process feed acid to ring about a precipitation of sodium silicofluoride and calcium sulfate. The recovered sodium silicofluoride product, however, presents a problem because of its high $P_2O_5$ content, which exceeds the specifications required by purchasers and because treatment of the crude product results in a fine powdery material which cannot be effectively separated from impurities.

We have discovered that by controlled treatment of the precipitated sodium silicofluoride product under high temperatures and slow cooling that a large crystal product can be obtained in quantity and in few steps and with the $P_2O_5$ content below the acceptable level of 0.05 percent by weight. By utilizing pressure and high temperatures in the dissolving of the sodium silicofluoride starting material in water containing less than 1 percent by weight of impurities and thereafter cooling slowly, large crystals can be obtained which are readily recovered as a high purity product. The water employed must contain less than 1 percent by weight of impurities in order to avoid excessive common ions and other factors that interfere with dissolution of the sodium silicofluoride.

A primary object, therefore, of the invention is to provide a process for the recovery of crystalline silicofluoride substantially fre of $P_2O_5$ content and of other impurities. A further object is to provide a process by which precipitated sodium silicofluoride is dissolved in water at high temperatures and then recrystallized to obtain a large granular crystal of chemically pure sodium silicofluoride. A still further object is to provide a process in which high temepartures and pressures are employed in the treatment of precipitated sodium silicofluoride followed by slow cooling to bring about a recovery of crystals in large size. Other specific objects and advantages will appear as the specification proceeds.

In one embodiment of our invention, sodium silicofluoride is recovered as a precipitate from wet process feed orthophosphoric acid, such as, for example, 30 weight percent $P_2O_5$ acid by adding sodium ions such as is provided by sodium sulfate, sodium carbonate, etc., and the precipitated sodium silicofluride is passed through a centrifuge, as, for example, a bowl centrifuge for the separation of the sodium silicofluoride. The sodium silicofluoride is then pulped with water and heated in a vessel at a temperature of at least 98° C. and preferably with gentle agitation. After the leaching of the mother liquor with the hot water, the material is cooled slowly to bring about the formation of large crystals.

The process is illustrated in one embodiment by the accompanying drawing in which apparatus useful in the carrying out of the process is shown diagrammatically. 10 indicates a sodium silicofluoride dissolution tank which is preferably closed to permit the building up of pressure therein. A portion of the tank is cut away to show an agitator 11 within the tank, the agitator being driven by motor 12. Sodium silicofluoride and hot water are introduced into the tank and gently agitated therein to bring about dissolving of the sodium silicofluoride. Tank 10 may, if desired, be heated. We desire to maintain a temperature of at least 98° C. and preferably higher. By utilizing superatmospheric pressure, higher temperatures which are found to be most effective in bringing about increased solubility of the sodium silicofluoride and thereby increasing the production rate of the product can be employed.

From the tank 10 there is an overflow to an insulated trap 13 for undissolved sodium silicofluoride, and from the trap 13 there is an overflow through line 14 to a crystallizing trough 15. The crystallizing trough is provided with a water cooling jacket 16 which flows to a recycle tank 17. Water may be recycled from tank 17 through line 18 to the tank 10.

To promote crystallization within the trough 15, we provide metal baffles 19 on which the sodium silicofluoride forms crystals. For example, metal surfaces are desired for crystallization of the large particle size sodium silicofluoride. The metal baffles provide surfaces on which the crystals cling, in order to nucleate and grow. Slow cooling of the saturated water solution of sodium silicofluoride is desired for large crystal growth. For example, when the sodium silicofluoride is dissolved in tank 10 at a temperature of about 98° C. and discharged from the trap into the crystallizing trough at a temperature of around 80° C., we prefer a retention time in the trough of 10 minutes and more with a discharge end temperature of around 60° C. In other words, by employing a 20–30° C. temperature drop through a period of 10 minutes to about 2 hours, we find that the crystals are formed in substantial quantity and in large size.

By employing pressures in tank 10 of about 10 to 100 pounds per square inch, and preferably between 20 and 60 pounds per square inch, we find that temperatures can be employed in the range of 100–250° C., and that as a result of the subsequent slow cooling of the saturated water solution, the production is increased manyfold.

The baffles which are useful in providing surfaces on which the crystals grow may be formed of any suitable metal, such as stainless steel, steel, iron, tin, etc. Smooth surfaces, such as glass, polyethylene, are not useful because the crystals cannot cling to such surfaces, but other materials of a wide range which provide roughened surfaces may be employed as baffles.

While slow cooling is necessary, the extent of the retention time during cooling for crystallization may vary substantially. Flash cooling by the use of refrigeration was found not to produce large crystals. However, a substantial amount of large crystals can be produced even when the retention time is relatively short, say, about 10 minutes. We prefer, however, a retention time of around 20 minutes, and this period may extend up to 2 hours with beneficial results. During the cooling period, we prefer to keep the exit temperature in the crystallization zone at at least 50° C. or above, and preferably above 60° C. It will be understood that the temperatures during cooling will vary substantially depending upon the temperatures employed in the dissolution tank, the impurities present, etc.

High temperatures play a significant part in the production of the large crystals. The hot water leaching at 98° C. and above followed by cooling results in the formation of very large crystals (20–30 mesh) around the sides of the reaction vessel just above the liquid level. These crystals amount to about 8 percent by weight of the total silicofluoride processed and are of extremely high purity. The entire process results in the production of +65 mesh crystals in quantity.

Why the high temperatures are found so significant in the production of the large crystal product, we cannot explain with certainty. Over and above producing an increase in solubility, the high temperatures apparently have some effect upon the impurities or other factors which cause the formation of large crystals during the cooling period.

Specific examples illustrative of the process may be set out as follows:

EXAMPLE I

A small crystallizer was built as shown in the drawing, the vessel 10 having a 10 gallon capacity and the insulated trap for undissolved sodium silicofluoride having a 2 gallon capacity. The vessel 10 was an open stainless steel tank, and the temperatures employed were 98–100° C. The sodium silicofluoride at a temperature of 98–99° C. was kept in gentle agitation with an overflow of silicofluoride to the trap 13. The baffles were located every 12 inches. Feed end temperature was 82° C., and the discharge end temperature was 60° C., the retention time in the crystallizer trough being 20 minutes. The water recycle rate was 100 cc. per minute. The product rate was ½ pound product per hour, the product being removed by hand every 2 or 3 hours. The chemical analysis of the product is set out in the following Table I:

TABLE I

| Material | Percent | | | | | | | |
|---|---|---|---|---|---|---|---|---|
| | +65 Mesh | $P_2O_5$ | CaO | $SO_4$ | $Fe_2O_3$ | $K_2O$ | $Na_2SiF_6$ | No./Ft.$^3$ |
| Feed | 1.0 | 0.11 | 0.26 | 0.59 | 0.06 | 0.04 | 99.2 | 77.5 |
| Product | 76.9 | 0.003 | 0.23 | 0.58 | 0.03 | 0.03 | 99.9 | 79.5 |

EXAMPLE II

The process was carried out as described in Example I with the product having the chemical analysis set out in Table II:

TABLE II

| Material | Percent | | | | | | | |
|---|---|---|---|---|---|---|---|---|
| | +65 Mesh | $P_2O_5$ | CaO | $SO_4$ | $Fe_2O_3$ | $K_2O$ | $Na_2SiF_6$ | No./Ft.$^3$ |
| Feed | 3.0 | 0.76 | 0.26 | 0.56 | 0.07 | 0.07 | 98.9 | 78.6 |
| Product | 77.0 | 0.03 | 0.21 | 0.43 | 0.04 | 0.04 | 99.5 | 78.3 |

EXAMPLE III

A stainless steel tank corresponding to tank 10 of the drawing is provided in a 30 gallon capacity as a pressure vessel and is operated in 60 pounds per square inch employing temperatures ranging from 105–250° C. The tank is provided with a stainless steel agitator and is heated with steam coils. The overflow is as shown in the drawing to an undissolved sodium silicofluoride trap also of stainless steel construction and having a 6 gallon capacity and closed as a pressure vessel for pressures up to 60 pounds per square inch. The vessel is insulated.

The overflow from the trap vessel is to a stainless steel trough 24 feet long, 6 inches wide and 6 inches high, fitted with a mild steel water cooling jacket, with 2 inches of water bottom and sides of the crystallizer trough. The trough is mounted in inclined position, with the end nearest the dissolution tank 6 inches higher than the water discharge end. The stainless steel trough has metal baffles every 6 inches along its length and is equipped with an automatic means for removing the baffles every 30 minutes and for replacing them with a clean set of baffles, means being also provided for stripping the product from the removed baffles.

By employing the foregoing apparatus and maintaining the high temperature and pressure conditions, the production rate of product is increased by at least fourfold.

EXAMPLE IV

The process was carried out as described in Example 1 except that instead of using an open tank 10, we employed a pressure cooked employing 15 pounds pressure. The sodium silicofluoride was reacted with water in a household pressure cooker for 30 minutes. Pressure was released quickly, the vessel opened, and a sample of the liquid taken as quickly as possible. The liquid sample was cooled to room temperature and analyzed for percent solids.

Solubility tests employing the pressure cooker were compared with solubility tests made with the open vessel tank employed in Example I. The following Table III is a summary of the solubility tests and shows that a pressure cooker can be expected to dissolve almost twice as much sodium silicofluoride as an open vessel.

TABLE III

| | Percent $Na_2SiF_6$ Soluble | |
|---|---|---|
| Test Number | Pressure cooker at 15 lbs. pressure | Agitated open tank at 210° F. |
| 1 | 1.62 | 1.4 |
| 2 | 2.25 | 1.51 |
| 3 | 2.14 | 0.98 |
| 4 | 2.14 | 1.31 |
| 5 | 3.11 | 1.59 |
| 6 | 2.02 | 1.69 |
| | | 0 |

While in the foregoing description we have described the precipitated sodium silicofluoride as being dissolved directly in hot water, it may be desirable in some cases to first repulp the precipitated sodium silicofluoride in cold water for the purpose of dissolving some impurities and then filtering the material, the recovered silicofluoride solids being then passed to the hot water tank 10. Our preferred operation, however, is to pass the precipitated sodium silicofluoride directly to the hot water tank because at the very high temperatures employed, the crystalline product can be obtained in substantially pure form and thus with a minimum of processing steps.

While in the foregoing specification we have set out specific procedures in considerable detail for the purpose of illustrating embodiments of the invention, it will be

We claim:

1. In a process for the preparation of crystalline sodium silicofluoride from wet process orthophosphoric acid containing impurities including fluosilicates and in which sodium ions are introduced into the wet process orthophosphoric acid to precipitate sodium silicofluoride and the precipitate recovered, the steps of dissolving the precipitate in hot water containing less than 1% by weight of impurities at a temperature of at least 98° C., and then slowly cooling the same to crystallize the sodium silicofluoride, said sodium silicofluoride product containing less than 0.05% by weight $P_2O_5$.

2. The process of claim 1 in which the precipitate is dissolved in water under superatmospheric pressure at a temperature in excess of 100° C.

3. The process of claim 1 in which the sodium silicofluoride is cooled slowly from a temperature of about 80° to about 60° C.

4. The process of claim 1 in which the precipitated sodium silicofluoride is first repulped in cold water and filtered before heating the silicofluoride.

5. In a process for the preparation of crystalline sodium silicofluoride of +65 mesh recovered as a precipitate, the steps of rissolving the precipitate in hot water containing less than 1% by weight of impurities at a temperature of at least 98° C. and under superatmospheric pressure, and slowly cooling the same during a period of at least 10 minutes to a temperature not substantially below 50° C.

6. A process for the preparation of substantially pure sodium silicofluoride crystals of +65 mesh and containing less than about 0.05% by weight $P_2O_5$ which comprises dissolving precipitated sodium silicofluoride containing impurities resulting from the introduction of sodium ions into wet process orthophosphoric acid in hot water containing less than 1% by weight of impurities at a temperature of at least 98° C. and forming said sodium silicofluoride crystals of +65 mesh by cooling the resulting solution to cause a 20 to 30° C. temperature drop over a period of about 10 minutes to about 2 hours.

7. The process of claim 6 wherein said cooling period is about 10 minutes to about 2 hours.

8. The process of claim 5 wherein said cooling period is about 10 minutes to about 2 hours.

9. The process of claim 1 wherein there is approximately a 20 to 30° C. temperature drop over a period of about 10 minutes to about 2 hours during said slow cooling to crystallize the sodium silicofluoride.

References Cited

UNITED STATES PATENTS

| | | | |
|---|---|---|---|
| 2,447,359 | 8/1948 | Oakley | 23—88 |
| 2,790,705 | 4/1957 | Kean et al. | 23—88 |
| 2,865,709 | 12/1958 | Horn et al. | 23—88 |
| 3,055,733 | 9/1962 | Lang et al. | 23—88 |
| 3,462,242 | 8/1969 | Barker et al. | 23—88 |

NORMAN YUDKOFF, Primary Examiner

R. T. FOSTER, Assistant Examiner

U.S. Cl. X.R.

23—88